United States Patent
Chen et al.

(10) Patent No.: US 11,281,597 B2
(45) Date of Patent: Mar. 22, 2022

(54) HIGH BANDWIDTH UNIVERSAL SERIAL BUS (USB) CAMERA

(71) Applicant: Intel Corporation, Santa Clara, CA (US)

(72) Inventors: Huimin Chen, Beaverton, OR (US); Karthi R. Vadivelu, Folsom, CA (US); Abdul R. Ismail, Beaverton, OR (US); Raul Gutierrez, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 1000 days.

(21) Appl. No.: 15/792,538

(22) Filed: Oct. 24, 2017

(65) Prior Publication Data

US 2019/0121752 A1 Apr. 25, 2019

(51) Int. Cl.
| | |
|---|---|
| *G06F 13/10* | (2006.01) |
| *G06F 13/28* | (2006.01) |
| *G06F 13/40* | (2006.01) |
| *H04N 5/232* | (2006.01) |
| *H04N 7/14* | (2006.01) |
| *G06F 13/38* | (2006.01) |
| *H04N 7/18* | (2006.01) |
| *G06F 13/42* | (2006.01) |

(52) U.S. Cl.
CPC ............ *G06F 13/102* (2013.01); *G06F 13/28* (2013.01); *G06F 13/385* (2013.01); *G06F 13/4027* (2013.01); *G06F 13/426* (2013.01); *H04N 5/23206* (2013.01); *H04N 7/142* (2013.01); *H04N 7/183* (2013.01); *G06F 2213/0042* (2013.01)

(58) Field of Classification Search
None
See application file for complete search history.

(56) References Cited

U.S. PATENT DOCUMENTS

| 2016/0164703 A1* | 6/2016 | Stone ................ H04L 25/03159 398/140 |
| 2016/0364360 A1* | 12/2016 | Lim ................ H04N 21/440218 |
| 2018/0300282 A1* | 10/2018 | Vertenten ................ G06F 5/065 |

* cited by examiner

*Primary Examiner* — Scott C Sun
(74) *Attorney, Agent, or Firm* — Schwabe, Williamson & Wyatt, P.C.

(57) ABSTRACT

Embodiments of the present disclosure are directed toward a universal serial bus (USB) device and a USB host controller. The USB device and USB host controller may be configured to couple to one another via a USB link that may include a high-speed data line and a low-speed data line. The USB device may then transmit, via the high-speed data line, an indication of a digital image to the USB host controller. Other embodiments may be described and/or claimed.

20 Claims, 3 Drawing Sheets

HIGH BANDWIDTH UNIVERSAL SERIAL BUS (USB) CAMERA

FIELD

Embodiments of the present disclosure generally relate to the field of peripheral devices, and more specifically to camera devices coupled with a host via a universal serial bus (USB) connection.

BACKGROUND

Existing implementations of digital cameras may be based on one of two possible approaches. A first approach may be to use an interconnect technology that is capable of high-throughput and long-channel reach. An example technology may be, for example, the camera serial interface (CSI) protocol as standardized by the mobile industry processor interface (MIPI) alliance. As most computing devices may not have a CSI interface on board, the use of the CSI protocol may require a bridge such as a USB to CSI bridge, or an Ethernet to CSI bridge. This bridge may allow implementation of the camera, but may introduce drawbacks such as high complexity at the physical (PHY) layer, and may also require a compromise of bandwidth efficiency. The bridge may also increase cost due to implementation overhead, and consume a relatively high amount of power.

A second approach may include use of an active repeater to extend the driving range of the link by compensating for channel loss over the link. This approach may be simpler than the first approach; however, it may include several proprietary elements that may hinder adoption and add additional cost.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure are directed toward a universal serial bus (USB) device and a USB host controller. The USB device and USB host controller may be configured to couple to one another via a USB link that may include a high-speed data line and a low-speed data line. The high-speed data line may be, for example, a superspeed (SS) data line. The low-speed data line may be, for example, a D+/D− data line. The USB device may then transmit, via the high-speed data line, an indication of a digital image to the USB host controller. Other embodiments may be described and/or claimed.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

Figure 1:
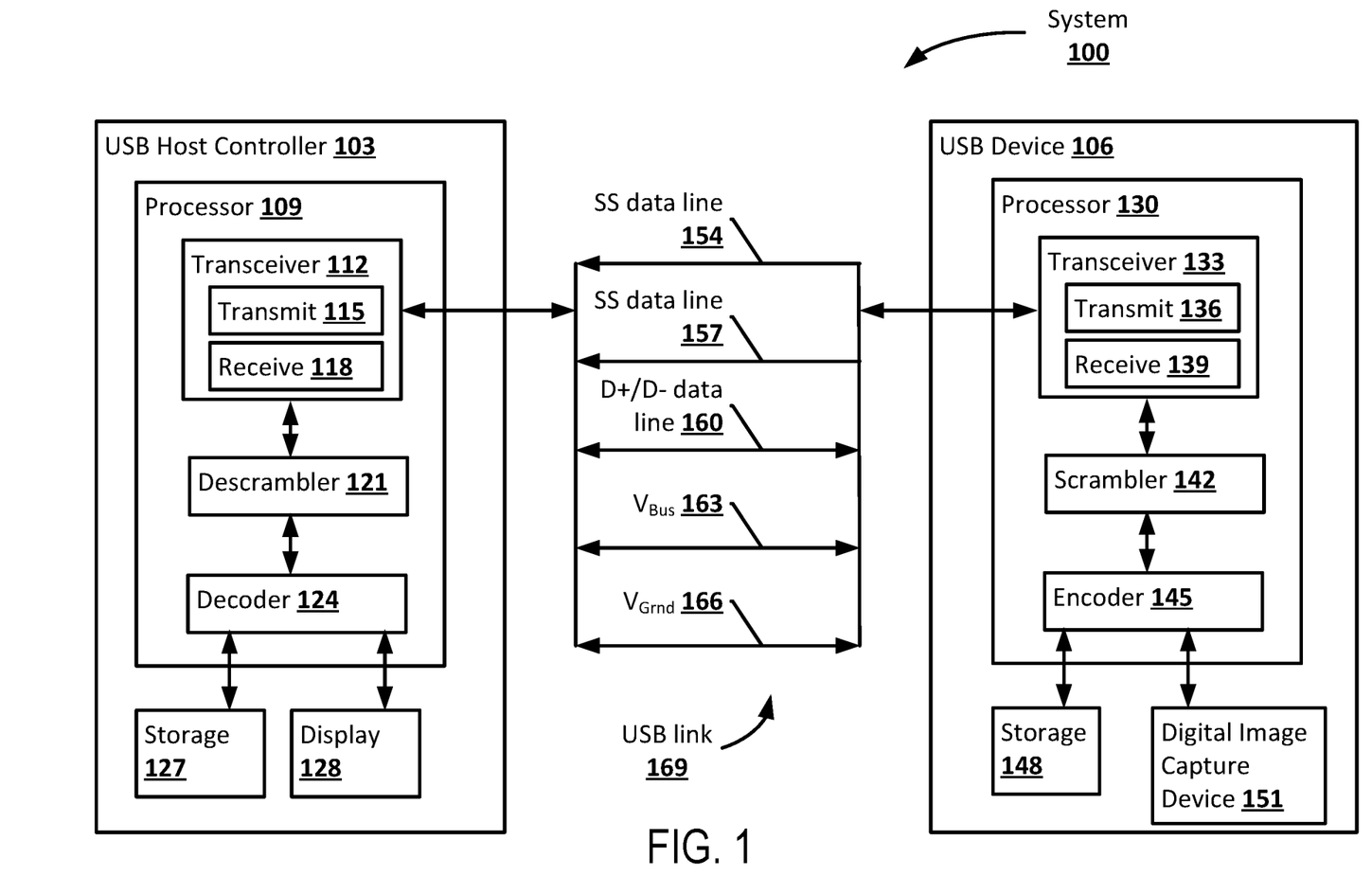
FIG. 1 illustrates an example system that includes a USB host controller and a USB device, in accordance with various embodiments.

FIG. 1 illustrates an example system 100 that includes a USB host controller 103 and a USB device 106, in accordance with various embodiments. The USB host controller 103 and the USB device 106 may be connected to one another via a USB link 169.

In embodiments, the USB host controller 103 may be, or may be an element of, a computing device such as a laptop, a desktop, a server, or some other type of computing device. The USB host controller 103 may include a processor 109 which may include a transceiver 112, a descrambler 121, and a decoder 124.

The transceiver 112 may include a transmit module 115 and a receive module 118. The transmit module 115 may be to transmit one or more signals from the USB host controller 103 to the USB device 106 via the USB link 169. Similarly, the receive module 118 may be to receive one or more signals from the USB device 106 along the USB link 169.

In embodiments, the signals transmitted or received via the USB link 169 may include one or more power signals, data signals, control signals, or some other type of signal. In some embodiments, the one or more signals may be, for example, an indication of a digital image such as a scrambled encoded digital image (or a portion thereof). In embodiments, the digital image may be a single digital image or it may be a plurality of digital images, for example, a video. In embodiments the indication of the digital image may include one or more full digital image(s), or it may include only a portion of one or more of the digital image(s). In some embodiments, though the term "encoded" is used for discussion purposes herein, other embodiments may refer to the indication as a scrambled "packetized" digital image. In other words, in some embodiments the terms "encoded" or "packetized' may be used interchangeably.

In embodiments, the processor 109 may include a descrambler 121. The descrambler 121 may receive the scrambled encoded digital image from the transceiver 112 and descramble it. Descrambling may include, for example, a polynomial implemented based on digital logic or some other type of descrambling algorithm or technique. As a result of the descrambling, the descrambler 121 may re-construct at least a portion of the data from the transmit module 136 of the USB Device 106 to generate an encoded digital image.

The decoder 124 may receive the encoded digital image from the descrambler 121. The decoder 124 may then decode the encoded image. Decoding may include, for example, a protocol decoder (or some other type of decoder), that may decode or unpack the encoded digital image received from the USB Device 106. By decoding or de-packetizing the encoded digital image, the decoder 124 may re-produce a digital image. As noted above, the digital image produced by the decoder 124 may be a single digital image, one or more digital images, or one or more portions of one or more digital images, or a digital video, or any other types of data.

The digital image re-produced by the decoder 124 may then be exported from the processor 109. In embodiments, the digital image may be exported to a storage 127 of the USB host controller 103. The storage may be, for example, a volatile or non-volatile storage such as a flash storage, a random access memory (RAM), a synchronous dynamic RAM (SDRAM), a double data rate (DDR) storage, or some other type of storage. In some embodiments, the digital image produced by the decoder 124 may additionally or alternatively be transmitted to a display 128 to be displayed to a user of the USB host controller 103. The display 128 may be, for example, a monitor that is integrated with the USB host controller 103, or a monitor coupled with the USB host controller 103 via a connection such as a high-definition multimedia interface (HDMI) connection.

It will be understood that the USB host controller 103 is merely one example of a USB host controller. In some embodiments, the processor 109 may be a single processor, while in other embodiments the processor 109 may be implemented as a plurality of processors. For example, one processor may include the descrambler 121 while another processor includes the decoder 124 (or other possible sub-combinations of the elements of the USB host controller 103). In some embodiments, the transceiver 112 may be implemented as separate modules, that is, transmit module 115 may be separate from receive module 118. In some embodiments one or more of the elements of the USB host controller 103, for example, the descrambler 121, the decoder 124, or some other element, may be implemented as hardware, software, firmware, or some combination thereof. Additionally, it will be noted that elements of the USB host controller 103 are only shown as examples and in embodiments the USB host controller 103 may have more elements, or some elements may be in a device communicatively coupled with the USB host controller 103.

In some embodiments, the USB device 106 may be or be an element of a device such as a smartphone, a digital camera, a tablet, a laptop, or some other device. Generally, the USB device 106 may be configured to couple with the USB host controller 103 via the USB link 169. More specifically, the USB device 106 may be a device that is configured to take or identify one or more digital images. As described above, the one or more digital images may be a single digital image or a plurality of digital images.

The USB device 106 may include a processor 130 that may have a transceiver 133, a scrambler 142, and an encoder 145. The transceiver 133 may be similar to transceiver 112 and may include a transmit module 136 (which may be similar to transmit module 115) and a receive module 139 (which may be similar to receive module 118). Specifically, the transmit module 136 may be for transmitting one or more signals to the USB host controller 103 via the USB link 169. The receive module 139 may be for receiving one or more signals from the USB host controller 103 via the USB link 169.

The processor 130 may be coupled with a storage 148, which may be similar to storage 127. The storage 148 may contain one or more digital images, or one or more portions thereof. The processor 130 may additionally or alternatively be coupled with a digital image capture device 151. The digital image capture device 151 may be or include, for example, a digital camera or a portion or element thereof. As one example, the digital image capture device 151 may be or include a complimentary metal-oxide-semiconductor (CMOS) image sensor, a charge-coupled device (CCD) image sensor, an n-type metal-oxide-semiconductor (NMOS) image sensor, or some other type of sensor. More generally, the digital image capture device 151 may be configured to capture an image and convert it to a digital form. The digital form may include a plurality of pixels and may be in accordance with a format such as a joint photographic experts group (JPEG) format, a graphics interchange format (GIF) format, a moving picture experts group (MPEG) format, or some other format.

The digital image may be provided from the storage 148 or the digital image capture device 151 to the processor 130. Specifically, the digital image may be provided to an encoder 145 of the processor 130. The encoder 145 may be configured to encode or packetize the digital image to generate an encoded digital image. Encoding or packetizing the digital image may include, for example, packetizing the image data per USB packet construction or some other type of encoding or packetizing technique or algorithm.

The encoded digital image may then be provided from the encoder 145 to a scrambler 142 of the processor 130. The scrambler 142 may be configured to scramble the encoded digital image to produce a scrambled encoded digital image (which may also be referred to as an indication of the digital image). Scrambling the encoded digital image may include, for example, use of a polynomial to randomize the encoded data, such that the resultant scrambled encoded digital image is direct current (DC) balanced and energy spread in the frequency domain such that the scrambled encoded digital image has desirable electromagnetic interference (EMI) or radiofrequency interference (RFI) characteristics. This scrambling technique is one example and other embodiments may include additional or alternative scrambling techniques. The scrambled encoded digital image may then be provided to the transceiver 133, and particularly the transmit module 136, for transmission to the USB host controller 103 via the USB link 169.

It will be understood that the USB device 106 is merely one example of a USB device. In some embodiments, the processor 130 may be a single processor, while in other embodiments the processor 130 may be implemented as a plurality of processors. For example, one processor may include the scrambler 142 while another processor includes the encoder 145 (or other possible subcombinations of the elements of the USB device 106). In some embodiments, the transceiver 133 may be implemented as separate modules, that is, transmit module 136 may be separate from receive module 139. In some embodiments one or more of the elements of the USB device 106, for example, the scrambler 142, the encoder 145, or some other element, may be implemented as hardware, software, firmware, or some combination thereof. Additionally, it will be noted that elements of the USB device 106 are only shown as examples and in embodiments the USB device 106 may have more elements, or some elements may be in a device communicatively coupled with the USB device 106.

The USB link 169 may be, include, or be a subset of the USB SS link, for example, in accordance with the USB 3.1 specification, revision 1.0, published on Jul. 26, 2013. The USB link 169 may include a plurality of lines. For example, the USB link 169 may include a bus voltage line $V_{Bus}$ 163 and a ground voltage line $V_{Grnd}$ 166. $V_{Bus}$ 163 and $V_{Grnd}$ 166 may be configured to carry voltage between the USB device 106 and the USB host controller 103. The USB link 169 may also include a D+/D− data line 160 configured to carry data between the USB host controller 103 and the USB device 106. Generally, the D+/D− data line 160 may be half-duplex link. More specifically, the D+/D− data line 160 may be implemented as a pair of wires that are electrically insulated from one another. One wire (e.g., the D+ wire) may carry data in one direction while another wire (e.g., the D− wire) may carry data in another direction. Additionally or alternatively, the two wires may carry data in the same direction at the same time. In some embodiments, the D+/D− data line 160 may be considered to be a relatively low-speed data line and have a maximum peak throughput of 480 megabits per second (Mbps). It will be understood that the term "low speed" is only used to distinguish this speed from the relatively high-speed data line discussed afterwards, and is not intended to qualitatively define the speed of the data line for other general purposes outside of the present discussion.

The USB link 169 may also include one or more unidirectional or SS simplex data lines 154, 157. Similarly to the D+/D− data line 160, the SS data lines 154, 157 may be implemented as a pair of wires that may be electrically insulated from one another. In some embodiments each of the SS data lines may be considered to be relatively high speed (again, a term used only to distinguish over the D+/D− data lines 160, and not intended to qualitatively define the speed of the data line for other general purposes outside of the present discussion). In some embodiments, the SS data lines 154 or 157 may be configured to transport data at up to 5 gigabits per second (5 Gbps). In other embodiments, the SS data lines 154 or 157 may be configured to transport data at up to 10 Gbps. Although the USB link 169 is depicted in FIG. 1 as including 2 SS data lines, in other embodiments the USB link 169 may include only a single SS data line, 3 data lines, 4 data lines, or some other number of data lines.

In some embodiments, the raw bandwidth required for an 8 megapixel digital image that is digitized at 10 bits per pixel in a 60 frames per second video may be approximately 4.8 Gbps. Therefore, in some embodiments the relatively low-speed D+/D− data lines 160 may not be sufficient to transmit the digital image because, as discussed above, they may only be able to transmit data at a rate of approximately 480 Mbps. However, the SS data lines 154 or 157 may be sufficient to transmit the digital image because, as discussed above, it may have a bandwidth of approximately 5 to 10 Gbps. Therefore, in some embodiments the transmit module 136 (or, more generally, the transceiver 133) may be configured to transmit the indication of the digital image via an SS data line such as SS data lines 154 or 157. Similarly, the receive module 118 (or, more generally, the transceiver 112) may be configured to receive the indication of the digital image via the SS data line.

More generally, the USB device 106 may present itself to the USB host controller 103 as a USB2 device. Camera control and configuration data may be transported between the USB device 106 and the USB host controller 103 via the D+/D− data lines 160. Otherwise, digital image data may be transmitted from the USB device 106 to the USB host controller 103 via the SS data lines 154 or 157.

Figure 2:
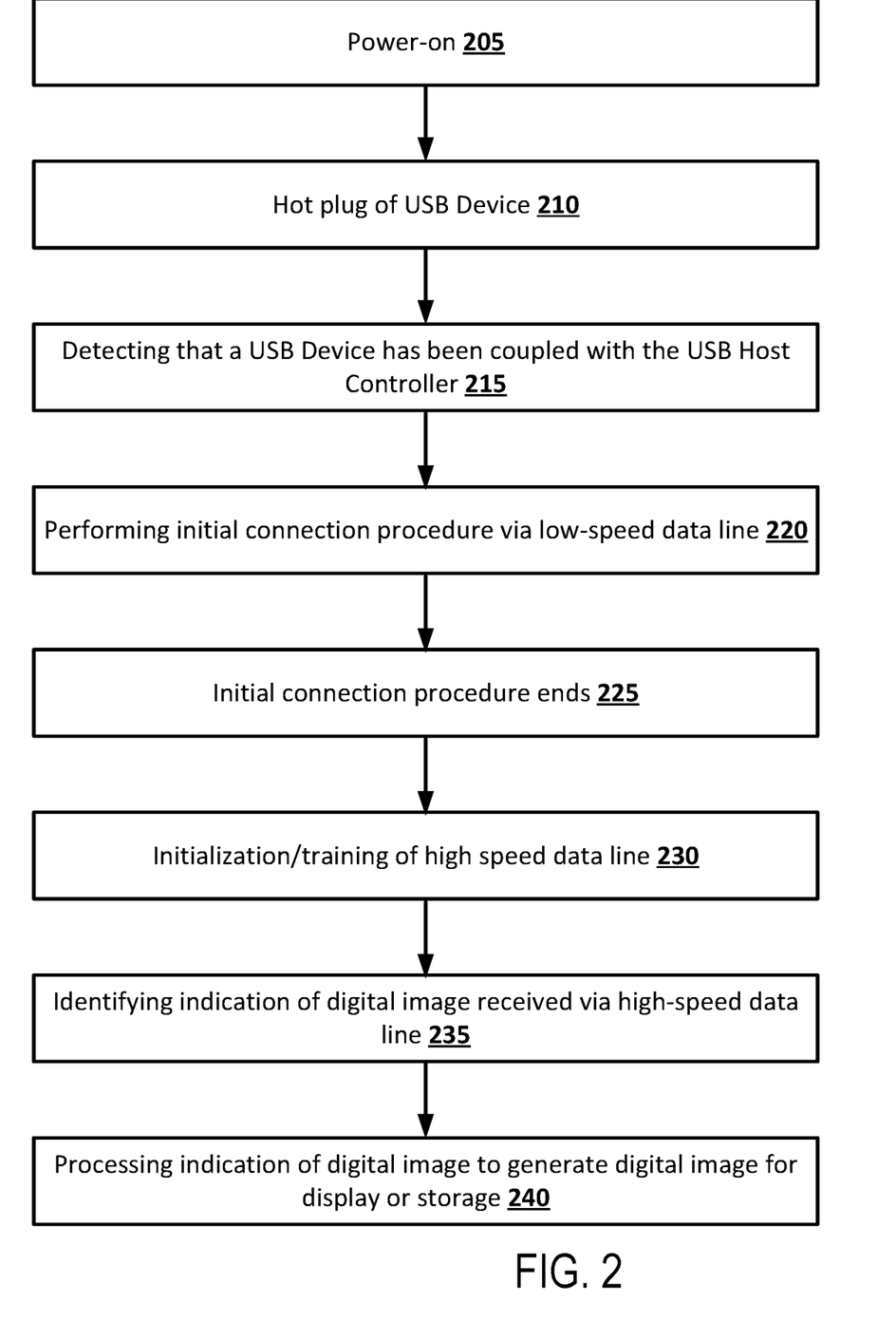
FIG. 2 illustrates an example technique for configuring a USB device to transmit image data via a USB link, in accordance with various embodiments.

FIG. 2 depicts an example technique for configuring a USB device such as USB device 106 to transmit image data via a USB link such as USB link 169, in accordance with various embodiments. Generally, the technique may be performed via a USB host controller such as USB host controller 103.

Initially, the technique may start with a power-on of the USB host controller at 205. For example, the USB host controller may be powered on by turning the USB host controller on. Alternatively, the USB host controller may be awoken from a sleep mode or some idle state.

A USB device such as USB device 106 may then be plugged into the USB host controller at 210. For example, the USB device may be connected with the USB host controller via a USB cable such that the USB device and the USB host controller can communicate with one another via a USB link such as USB link 169. In embodiments where the USB host controller is already operational, such an introduction of the USB device may be referred to as a "hot plug" of the USB device.

When the USB device is plugged in to the USB host controller, the USB host controller may detect the presence of the USB device at 215. Specifically, the USB device may initially present as a USB2 device (that is, a USB device without the SS data lines). More specifically, the SS simplex link may be in a disabled state (e.g., eSS.Disabled). The USB host controller may identify that the USB device has been plugged in to the USB host controller because a positive signal may be received on the D+ wire of the D+/D− data line.

The USB host controller may then perform an initial connection procedure via a low-speed data line (e.g., the D+/D− data line 160) at 220. Specifically, the USB host controller may query the USB device for its capabilities, and the USB device may respond accordingly. Alternatively, the USB device may simply provide one or more indications of its capabilities to the USB host controller. The USB host controller may also provide configuration information to the USB device. This configuration information may include information related to the SS simplex link such as a speed setting or a lane configuration. The USB host controller may also, via the D+/D− data line, provide control information to the USB device that sets the USB device as a USB2 control endpoint (EP) for SS simplex link training related to the SS data lines 154 or 157. The initial connection procedure may then end at 225.

The USB host controller and the USB device may then enter initialization and training of a high-speed data line such as the SS data line at 230. The initialization and training may include SS simplex link training. Specifically, the SS data lines 154 or 157 may enter host-managed link training where data is transmitted between the USB host controller and the USB device via the SS data lines 154 or 157 such that initial transmission and reception parameters may be established. The transmission and reception parameters may include, for example, time-related information, frequency-related information, coding-related information, etc. In some embodiments, the SS simplex link training may include performing the simplex link training based on a closed-loop mechanism via the D+/D− data line.

After the training is complete at 230, the USB host controller may then identify an indication of a digital image received via a high-speed data line at 235. As noted above, the indication of the digital image may include, for example, a scrambled encoded one or more digital images or portions thereof.

The USB host controller may then process the indication of the digital image to generate a digital image for display or storage at 240. For example, the processing may include descrambling (e.g., by descrambler 121), decoding (e.g., by decoder 124), or some other type of processing. The display may include, for example, displaying the digital image by display 128. Alternatively, the storage may include, for example, storing the digital image in storage 127 as described above.

Figure 3:
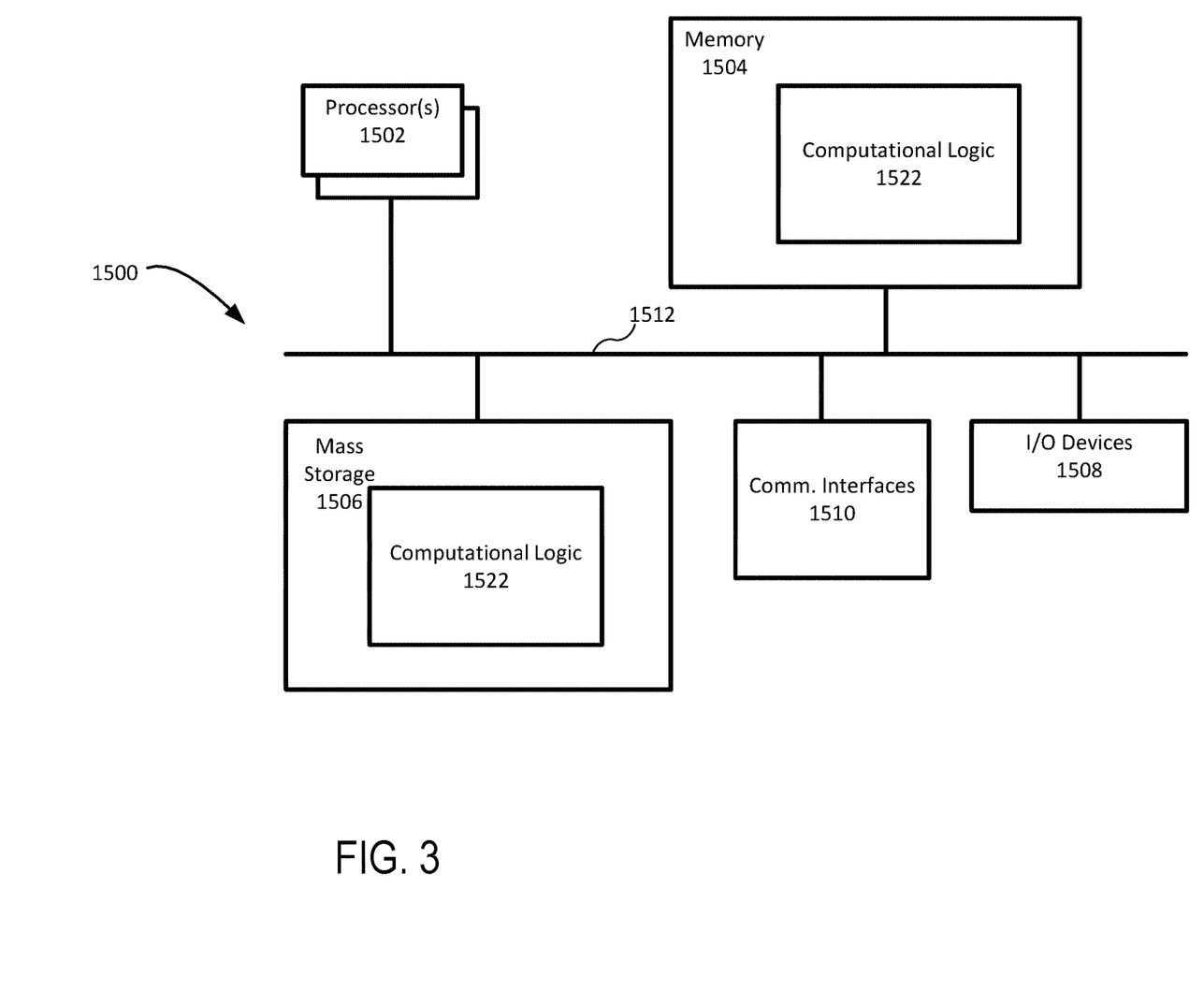
FIG. 3 illustrates an example computing device, in accordance with various embodiments.

FIG. 3 illustrates an example computing device 1500 suitable for use with various components of FIG. 1, such as the USB host controller 103 or the USB device 106, in accordance with various embodiments. Specifically, in some embodiments, the computing device 1500 may be the USB host controller 103 or the USB device 106. Alternatively, the USB host controller 103 or the USB device 106 may be an element of the computing device 1500, for example implemented as hardware, firmware, software, or some combination thereof. Specifically, the processor(s) 1502 may be processor 109 or processor 130.

As shown, computing device 1500 may include one or more processors or processor cores 1502 and system memory 1504. For the purpose of this application, including the claims, the terms "processor" and "processor cores" may be considered synonymous, unless the context clearly requires otherwise. The processor 1502 may include any type of processors, such as a central processing unit (CPU), a microprocessor, and the like. The processor 1502 may be implemented as an integrated circuit having multi-cores, e.g., a multi-core microprocessor. The computing device 1500 may include mass storage devices 1506 (such as diskette, hard drive, volatile memory (e.g., dynamic random-access memory (DRAM), compact disc read-only memory (CD-ROM), digital versatile disk (DVD), and so forth). In general, system memory 1504 and/or mass storage devices 1506 may be temporal and/or persistent storage of any type, including, but not limited to, volatile and non-volatile memory, optical, magnetic, and/or solid state mass storage, and so forth. Volatile memory may include, but is not limited to, static and/or dynamic random-access memory. Non-volatile memory may include, but is not limited to, electrically erasable programmable read-only memory, phase change memory, resistive memory, and so forth. In embodiments, the system memory 1504 and/or mass storage devices 1506 may be storage 127 or 148.

The computing device 1500 may further include input/output (I/O) devices 1508 (such as a display (e.g., a touch-screen display), keyboard, cursor control, remote control, gaming controller, image capture device, and so forth) and communication interfaces 1510 (such as network interface cards, modems, infrared receivers, radio receivers (e.g., Bluetooth), and so forth).

The communication interfaces 1510 may include communication chips (not shown) that may be configured to operate the device 1500 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 1510 may operate in accordance with other wireless protocols in other embodiments.

The above-described computing device 1500 elements may be coupled to each other via system bus 1512, which may represent one or more buses. In the case of multiple buses, they may be bridged by one or more bus bridges (not shown). Each of these elements may perform its conventional functions known in the art. In particular, system memory 1504 and mass storage devices 1506 may be employed to store a working copy and a permanent copy of the programming instructions for the operation of the system 100 of FIG. 1 (or elements thereof). The various elements may be implemented by assembler instructions supported by processor(s) 1502 or high-level languages that may be compiled into such instructions.

The permanent copy of the programming instructions may be placed into mass storage devices 1506 in the factory, or in the field, through, for example, a distribution medium (not shown), such as a compact disc (CD), or through communication interface 1510 (from a distribution server (not shown)). That is, one or more distribution media having an implementation of the agent program may be employed to distribute the agent and to program various computing devices.

The number, capability, and/or capacity of the elements 1508, 1510, 1512 may vary, depending on whether computing device 1500 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, memory 1504 may include computational logic 1522 configured to practice aspects of the technique of FIG. 2 or techniques or processes related to elements of FIG. 1. For one embodiment, at least one of processors 1502 may be packaged together with computational logic 1522 configured to practice aspects of optical signal transmission and receipt described herein to form a System in Package (SiP) or a System on Chip (SoC).

In various implementations, the computing device 1500 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 1500 may be any other electronic device that processes data.

Example 1 may include a universal serial bus (USB) device comprising: a digital image capture device to capture a digital image; and a processor coupled with the image capture device, the processor to: identify, in a USB link by which the USB device is coupled with a USB host controller, a high-speed data line and a low-speed data line; and transmit, via the high-speed data line, an indication of the digital image to the USB host controller.

Example 2 may include the USB device of example 1, wherein the high-speed data line has a throughput of greater than 1 gigabit per second (Gbps).

Example 3 may include the USB device of example 2, wherein the high-speed data line is a USB superspeed (SS) data line.

Example 4 may include the USB device of example 1, wherein the low-speed data line has a maximum peak throughput of 480 megabits per second (Mbps).

Example 5 may include the USB device of example 4, wherein the low-speed data line is a USB D+/D− paired data line.

Example 6 may include the USB device of any of examples 1-5, wherein the digital image comprises a plurality of digital images.

Example 7 may include the USB device of any of examples 1-5, wherein the USB link includes a voltage line, a ground line, the low-speed data line, and one or more high-speed data lines.

Example 8 may include the USB device of any of examples 1-5, wherein the indication of the digital image is a scrambled encoded digital image, and wherein the processor includes a high-speed data transport module that includes: encoder circuitry to encode the digital image to generate an encoded digital image; scrambler circuitry to scramble the encoded digital image to generate the scrambled encoded digital image; and transmit circuitry to transmit the scrambled encoded digital image via the high-speed data line.

Example 9 may include a universal serial bus (USB) host controller comprising: a USB port to couple with a USB device via a USB link that includes a high-speed data line and a low-speed data line; and a processor coupled with the USB port, the processor to identify an indication of a digital image received from the USB device via the high-speed data line.

Example 10 may include the USB host controller of example 9, wherein the high-speed data line has a throughput of greater than 1 gigabit per second (Gbps).

Example 11 may include the USB host controller of example 10, wherein the high-speed data line is a USB superspeed (SS) data line.

Example 12 may include the USB host controller of example 9, wherein the low-speed data line has a maximum peak throughput of 480 megabits per second (Mbps).

Example 13 may include the USB host controller of example 12, wherein the low-speed data line is a USB D+/D− paired data line.

Example 14 may include the USB host controller of any of examples 9-13, wherein the digital image comprises a plurality of digital images.

Example 15 may include the USB host controller of any of examples 9-13, wherein the USB link includes a voltage line, a ground line, the low-speed data line, and one or more high-speed data lines.

Example 16 may include the USB host controller of any of examples 9-13, wherein the indication of the digital image is an encoded scrambled digital image, and wherein the processor includes a high-speed data transport module that includes: receive circuitry to receive, via the high-speed data line, the encoded scrambled digital image; descrambler circuitry to descramble the encoded scrambled digital image to generate an encoded digital image; and decoder circuitry to decode the encoded digital image to generate a digital image.

Example 17 may include the USB host controller of example 16, further comprising a display coupled with the processor, the display to display the digital image.

Example 18 may include the USB host controller of example 16, further comprising a storage media to store the digital image.

Example 19 may include a method to be performed by a universal serial bus (USB) host controller, the method comprising: detecting, by the USB host controller, that a USB device has been coupled with the USB host controller by a USB link; performing, by the USB host controller, an initial connection procedure via a low-speed data line of the USB link; initializing, by the USB host controller, a high-speed data line of the USB link; identifying, by the USB host controller, an indication of a digital image received by the USB host controller from the USB device via the high-speed data line; and processing, by the USB host controller, the indication of the digital image to generate a digital image for display to a user of the USB host controller.

Example 20 may include the method of example 19, wherein the high-speed data line has a throughput of greater than 1 gigabit per second (Gbps).

Example 21 may include the method of example 20, wherein the high-speed data line is a USB superspeed (SS) data line.

Example 22 may include the method of example 19, wherein the low-speed data line has a maximum peak throughput of 480 megabits per second (Mbps).

Example 23 may include the method of example 22, wherein the low-speed data line is a USB D+/D− paired data line.

Example 24 may include the method of any of examples 19-23, wherein the digital image comprises a plurality of digital images.

Example 25 may include the method of any of examples 19-23, wherein the USB link includes a voltage line, a ground line, the low-speed data line, and one or more high-speed data lines.

Example 26 may include the method of any of examples 19-23, wherein the indication of the digital image is an encoded scrambled digital image, and wherein the processing the indication of the digital image includes: descrambling, by the USB host controller, the encoded scrambled digital image to generate an encoded digital image; and decoding, by the USB host controller, the encoded digital image to generate the digital image.

Example 27 may include the method of any of examples 19-23, wherein the initializing, by the USB host controller, a high-speed data line of the USB link includes performing, by the USB host controller via the low-speed data line, simplex link training on the high-speed data line based on a closed-loop mechanism.

Example 28 may include a universal serial bus (USB) host controller comprising: means to detect that a USB device has been coupled with the USB host controller by a USB link; means to perform an initial connection procedure via a low-speed data line of the USB link; means to initialize a high-speed data line of the USB link; means to identify an indication of a digital image received by the USB host controller from the USB device via the high-speed data line; and means to process the indication of the digital image to generate a digital image for display to a user of the USB host controller.

Example 29 may include the USB host controller of example 28, wherein the high-speed data line has a throughput of greater than 1 gigabit per second (Gbps).

Example 30 may include the USB host controller of example 29, wherein the high-speed data line is a USB superspeed (SS) data line.

Example 31 may include the USB host controller of example 28, wherein the low-speed data line has a maximum peak throughput of 480 megabits per second (Mbps).

Example 32 may include the USB host controller of example 31, wherein the low-speed data line is a USB D+/D− paired data line.

Example 33 may include the USB host controller of any of examples 28-32, wherein the digital image comprises a plurality of digital images.

Example 34 may include the USB host controller of any of examples 28-32, wherein the USB link includes a voltage line, a ground line, the low-speed data line, and one or more high-speed data lines.

Example 35 may include the USB host controller of any of examples 28-32, wherein the indication of the digital image is an encoded scrambled digital image, and wherein the means to process the indication of the digital image includes: means to descramble the encoded scrambled digital image to generate an encoded digital image; and means to decode the encoded digital image to generate the digital image.

Example 36 may include the USB host controller of any of examples 28-32, wherein the means to initialize a high-speed data line of the USB link include means to perform, via the low-speed data line, simplex link training on the high-speed data line based on a closed-loop mechanism.

Example 37 may include one or more non-transitory computer-readable media comprising instructions that, upon execution of the instructions by one or more processors, are to cause a universal serial bus (USB) host controller to: detect that a USB device has been coupled with the USB host controller by a USB link; perform an initial connection procedure via a low-speed data line of the USB link; initialize a high-speed data line of the USB link; identify an indication of a digital image received by the USB host controller from the USB device via the high-speed data line; and process the indication of the digital image to generate a digital image for display to a user of the USB host controller.

Example 38 may include the one or more non-transitory computer-readable media of example 37, wherein the high-speed data line has a throughput of greater than 1 gigabit per second (Gbps).

Example 39 may include the one or more non-transitory computer-readable media of example 38, wherein the high-speed data line is a USB superspeed (SS) data line.

Example 40 may include the one or more non-transitory computer-readable media of example 37, wherein the low-speed data line has a maximum peak throughput of 480 megabits per second (Mbps).

Example 41 may include the one or more non-transitory computer-readable media of example 40, wherein the low-speed data line is a USB D+/D− paired data line.

Example 42 may include the one or more non-transitory computer-readable media of any of examples 37-41, wherein the digital image comprises a plurality of digital images.

Example 43 may include the one or more non-transitory computer-readable media of any of examples 37-41, wherein the USB link includes a voltage line, a ground line, the low-speed data line, and one or more high-speed data lines.

Example 44 may include the one or more non-transitory computer-readable media of any of examples 37-41, wherein the indication of the digital image is an encoded scrambled digital image, and wherein the instructions to process the indication of the digital image include instructions to: descramble the encoded scrambled digital image to generate an encoded digital image; and decode the encoded digital image to generate the digital image.

Example 45 may include the one or more non-transitory computer-readable media of any of examples 37-41, wherein the instructions to initialize a high-speed data line of the USB link include instructions to perform, via the low-speed data line, simplex link training on the high-speed data line based on a closed-loop mechanism.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. A universal serial bus (USB) device comprising:
a digital image capture device to capture a digital image; and
a processor coupled with the image capture device, the processor to:
identify, in a USB link by which the USB device is coupled with a USB host controller, a high-speed data line and a low-speed data line, wherein the high-speed data line is in a disabled state;
perform a connection procedure with the USB host controller via the low-speed data line, which includes to receive configuration information to initialize and train the high-speed data line;
perform initialization and training of the high-speed data line, to enable the high-speed data line for data transmission; and
transmit, via the enabled and trained high-speed data line, an indication of the digital image to the USB host controller.

2. The USB device of claim 1, wherein the high-speed data line has a throughput of greater than 1 gigabit per second (Gbps).

3. The USB device of claim 1, wherein the low-speed data line has a maximum peak throughput of 480 megabits per second (Mbps).

4. The USB device of claim 1, wherein the digital image comprises a plurality of digital images.

5. The USB device of claim 1, wherein the USB link includes a voltage line, a ground line, the low-speed data line, and one or more high-speed data lines.

6. The USB device of claim 1, wherein the indication of the digital image is a scrambled encoded digital image, and wherein the processor includes a high-speed data transport module that includes:
encoder circuitry to encode the digital image to generate an encoded digital image;
scrambler circuitry to scramble the encoded digital image to generate the scrambled encoded digital image; and
transmit circuitry to transmit the scrambled encoded digital image via the high-speed data line.

7. A universal serial bus (USB) host controller comprising:
a USB port to couple with a USB device via a USB link that includes a high-speed data line and a low-speed data line, wherein the high-speed data line is in a disabled state, wherein to couple includes to perform a connection procedure with the USB device via the low-speed data line, wherein the connection procedure includes to: provide configuration information to initialize and train the high-speed data line at the USB device; and perform initialization and training of the high-speed data line, to enable the high-speed data line for data transmission; and
a processor coupled with the USB port, the processor to identify an indication of a digital image received from the USB device via the enabled and trained high-speed data line.

8. The USB host controller of claim 7, wherein the high-speed data line has a throughput of greater than 1 gigabit per second (Gbps).

9. The USB host controller of claim 7, wherein the low-speed data line has a maximum peak throughput of 480 megabits per second (Mbps).

10. The USB host controller of claim 7, wherein the digital image comprises a plurality of digital images.

11. The USB host controller of claim 7, wherein the USB link includes a voltage line, a ground line, the low-speed data line, and one or more high-speed data lines.

12. The USB host controller of claim 7, wherein the indication of the digital image is an encoded scrambled digital image, and wherein the processor includes a high-speed data transport module that includes:
receive circuitry to receive, via the high-speed data line, the encoded scrambled digital image;
descrambler circuitry to descramble the encoded scrambled digital image to generate an encoded digital image; and
decoder circuitry to decode the encoded digital image to generate a digital image.

13. The USB host controller of claim 12, further comprising a display coupled with the processor or a storage media coupled with the processor, the display to display the digital image and the storage media to store the digital image.

14. A method comprising:
detecting, by a universal serial bus (USB) host controller, that a USB device has been coupled with the USB host controller by a USB link, wherein the USB link includes a high-speed data line and a low-speed data line, wherein the high-speed data line is in a disabled state;
performing, by the USB host controller, an initial connection procedure via the low-speed data line of the USB link, which includes providing configuration information to initialize and train the high-speed data line;
initializing and training, by the USB host controller, the high-speed data line of the USB link, to enable the high-speed data line for data transmission;
identifying, by the USB host controller, an indication of a digital image received by the USB host controller from the USB device via the enabled and trained high-speed data line; and
processing, by the USB host controller, the indication of the digital image to generate a digital image for display to a user of the USB host controller.

15. The method of claim 14, wherein the high-speed data line has a throughput of greater than 1 gigabit per second (Gbps).

16. The method of claim 14, wherein the low-speed data line has a maximum peak throughput of 480 megabits per second (Mbps).

17. The method of claim 14, wherein the digital image comprises a plurality of digital images.

18. The method of claim 14, wherein the USB link includes a voltage line, a ground line, the low-speed data line, and one or more high-speed data lines.

19. The method of claim 14, wherein the indication of the digital image is an encoded scrambled digital image, and wherein the processing the indication of the digital image includes:
descrambling, by the USB host controller, the encoded scrambled digital image to generate an encoded digital image; and
decoding, by the USB host controller, the encoded digital image to generate the digital image.

20. The method of claim 14, wherein the initializing, by the USB host controller, a high-speed data line of the USB link includes performing, by the USB host controller via the low-speed data line, simplex link training on the high-speed data line based on a closed-loop mechanism.

* * * * *